United States Patent [19]

Micheron et al.

[11] Patent Number: 5,440,400
[45] Date of Patent: Aug. 8, 1995

[54] DEVICE FOR PROGRAMMING OF RECORDING BY REFERENCE SIGNALS RECOGNITION

[75] Inventors: François Micherson, Gif-sur-Yvette; Dominique Potier, Sevres; Philippe Refregier, Palaiseau, all of France

[73] Assignee: Thomson Consumer Electronics, Courbevoie, France

[21] Appl. No.: 327,811

[22] Filed: Oct. 17, 1994

Related U.S. Application Data

[63] Continuation of Ser. No. 132,222, Oct. 6, 1993, abandoned, which is a continuation of Ser. No. 684,967, filed as PCT/FR90/00686, Sept. 25, 1990, abandoned.

[30] Foreign Application Priority Data

Oct. 3, 1989 [FR] France ............... 89 12891

[51] Int. Cl.⁶ ............................................. H04N 9/79
[52] U.S. Cl. ..................... 358/335; 358/310; 358/343
[58] Field of Search ............... 358/311, 313, 335, 342, 358/310, 343, 341; 360/32, 14.1, 11.1; H04N 9/79

[56] References Cited

U.S. PATENT DOCUMENTS

| | | | |
|---|---|---|---|
| 4,272,787 | 6/1981 | Michael et al. | 359/160 |
| 4,845,564 | 7/1989 | Hakamada et al. | 358/183 |
| 4,862,264 | 8/1989 | Wells et al. | |
| 4,879,611 | 11/1989 | Fukui et al. | 360/69 |
| 5,138,503 | 8/1992 | Nishida | 360/35.1 |

FOREIGN PATENT DOCUMENTS 0256152 2/1988 European Pat. Off. .

OTHER PUBLICATIONS

IEEE Transactions on Consumer Electronics, vol. 33, No. 3, Aug. 1987, (New York, US) M. Masuda et al.: "Picture in picture system with a digital memory for vcrs", pp. 230–238.

*Primary Examiner*—Tommy P. Chin
*Assistant Examiner*—Robert Chevalier
*Attorney, Agent, or Firm*—Oblon, Spivak, McClelland, Maier, & Neustadt

[57] ABSTRACT

A driving device for driving a recording apparatus for selective recording of audio/video sequences, which is to actuate the recording apparatus at a precise instant of a beginning or of an ending of the audio/video sequence to be recorded. The driving device reduces picture datum from at least one reference picture belonging to the sequence to be recorded and a memory stores the reduced reference picture datum. A comparator compares the stored reduced reference datum with reduced picture data picked up from the set of picture sequences. A controller controls the recording apparatus to be activated to begin recording at the time the comparator detects a recognition of a picture similar to the stored reduced reference datum in the set of picture sequences.

19 Claims, 2 Drawing Sheets

DEVICE FOR PROGRAMMING OF RECORDING BY REFERENCE SIGNALS RECOGNITION

This application is a Continuation of application Ser. No. 08/132,222, filed Oct. 6, 1993, abandoned, which was a continuation of Ser. No. 07/684,967, filed May 24, 1991, abandoned, which was filed as International Application No. PCT/FR90/00686 on Sep. 25, 1990.

BACKGROUND OF THE INVENTION

The field of the present application relates to the programming of a tape recorder or of a video recorder in its recording function.

DISCUSSION OF THE BACKGROUND

The programming of recording of a video recorder is usually carried out by selecting a date and an hour. It is therefore implicitly assumed that the program to be recorded will be broadcast or distributed at the planned date and at the planned hour. Experience shows however that this programming can at best be carried out to within a few minutes, which results in either a gap at the start of the recorded transmission or in the recording of unwanted sequences.

The problem is all the more crucial when the programming comprises more successive sequences each constituted by a recording period followed by a pause.

SUMMARY OF THE INVENTION

The objective of the invention is in particular to overcome this disadvantage.

More precisely, the objective of the invention is to furnish a device for selective recording of audio-visual sequences, which is to be actuated at the exact instants of beginning or of ending of the recorded audio-visual sequence.

Another objective of the invention is to furnish such a device which can be implemented at reduced cost and with good efficiency of operation, in audio-visual recording systems of the type for the general public.

These objectives, as well as others which will emerge later on, are achieved with the aid of a device for driving an apparatus for selective recording of an audio and/or video sequence on the basis of a set of received sequences, characterised in that it comprises:
means for reducing the audio and/or video datum from a reference portion belonging to the sequence to be recorded;
means for storing the reduced datum;
means for comparing the stored reduced datum with reduced data picked up from the set of received sequences;
means for controlling the recording apparatus, which are activated by the means for comparing at the time of the recognition of the reference portion in the set of sequences.

In a preferred embodiment of the invention, the invention relates more particularly to a device for driving an apparatus for selective recording of a picture sequence on the basis of a set of electronic picture sequences, characterised in that it comprises:
means for reducing the picture datum from at least one reference picture belonging to the said sequence to be recorded;
a memory for storing the said reference picture reduced datum;
means for comparing the said stored reduced datum with reduced picture data picked up from the said set of picture sequences;
means for controlling the said recording apparatus, which are activated by the said means for comparing at the time of the recognition of a picture similar to the reference picture in the set of picture sequences.

Advantageously, in the case of the recognition of pictures, the means for reducing the picture datum are chosen from at least one of the means belonging to the group comprising the reduction of the levels of the component of luminances, the reduction of at least one of the components of luminances and/or of chrominances of the picture, the reduction of the level of at least one of the luminance and/or chrominance components, the under-sampling of the picture or of one of the frames of the picture, the picking-up from the picture of a picture portion, the partitioning of the picture into picture blocks by associating with each block the average value of the luminance datum for the pixels of the block.

Preferably, the means for comparing interact with means for picking up pictures from the set of sequences, means for numbering the picked-up pictures, and the means for reducing the picture datum from the said picked-up numbered pictures.

Furthermore, the pictures are advantageously picked up from the set of picture sequences at a frequency less than the picture frequency, or than the frame frequency.

In a preferred embodiment, the means for comparing comprise a single logic gate receiving as an input the elements of reduced picture datum from the stored reference picture and from a picture picked up from the set of sequences, which are synchronised in the order of scanning, and furnishing as an output a recognition datum for each pair of elements of reduced picture datum received as the input. These means for comparing comprise advantageously a counter incremented each time that the logic gate furnishes a positive recognition-datum.

In this case, the means of controlling the recording apparatus are activated each time that, for a picked-up picture, the counter exceeds a predetermined threshold.

In another embodiment, the said means for comparing belong to the group comprising the correlators by mathematical transformation and the techniques using artificial intelligence.

The invention also relates to a device characterised in that it comprises on the one hand a circuit for picture recognition, and on the other hand a circuit for recognition of an audio signal, and in that means for recording of an audio-visual signal are actuated either at the time of the simultaneous recognition of a reference picture and of a reference sound in the received signal, or at the time of the recognition of at least one picture or one reference sound. The means for comparing the audio signal advantageously comprise means for sampling a received audio signal, and means for comparing the sampled signals with a previously memorised reference audio signal portion.

It will be noted that the embodiment with simultaneous recognition of the video and audio signals makes it possible to avoid the untimely recording of undesired sequences. Conversely, when the recording device can be actuated by at least one of the two recognition systems, the risks are overcome of failure of the recognition means due for example to the scrambling of the received signal or to any other cause from analogous effects.

BRIEF DESCRIPTION OF DRAWINGS

Other characteristics and advantages of the invention will emerge on the following reading of preferred embodiments of the invention, given by way of illustrative and non-limiting example, and of the attached drawings in which.

DESCRIPTION OF THE PREFERRED EMBODIMENTS

Figure 1:
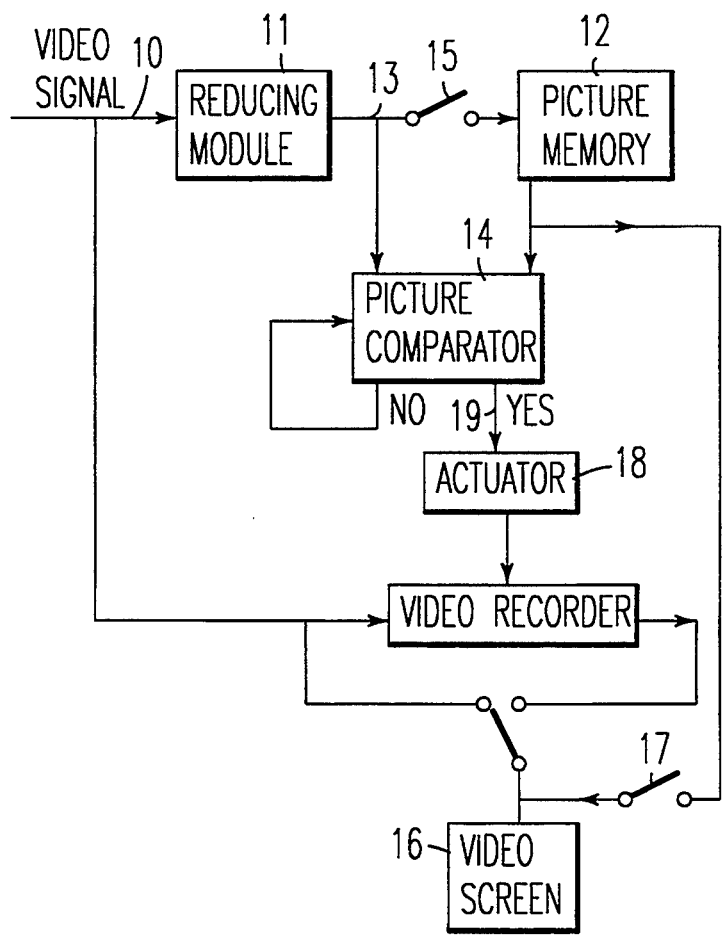
FIG. 1 represents a block diagram of a picture recognition device, according to the invention.

As represented in FIG. 1, the device of the invention comprises advantageously the following modules, in a preferred embodiment:

a module 11 for reducing the "format" of the pictures 10, so as to produce a reduced picture datum 13.

In the case where, for example, the picture is formed from a video signal 10 with the format of 625 lines, of 400 resolved dots per line, three-colour, coded on 7 bits, the reduced picture datum 13 can be reduced down to $64 \times 64$ pixels which are monochrome (luminance signals only), coded on 3 or 4 levels. This format reduction can be performed by calculating averages of the luminance intensities of the pixels in blocks regularly partitioned in the original picture in order to reduce it to a $64 \times 64$ matrix, or again by $64 \times 64$—pixel sampling either in the complete picture, or again in one of the two interlaced half-frames.

Such format reducing circuits are for example used for the "inlaying" of small pictures in the main picture of the television.

The reduction in number of levels of luminance is advantageously done by comparing with level thresholds.

Rather than reducing the format of the picture, it is also possible, in regard to the storing and the comparing, to consider only part of the picture (the center of the picture for example), so as to select the same reduced number of bits.

A picture memory 12 stores the picture datum 13 in the reduced format and it is in this memory 12 that the reference picture to be recognised is stored.

Advantageously, in the case where the module 11 for reducing the picture format is used in dc mode to process the video signal 10, the storing of the reference picture is for example performed on closing a breaker 15.

The reference picture stored in memory 12 can also be viewed on the video screen 16 for projecting the transmissions, by closing a breaker 17. This operation corresponds for example to a control for selecting the memorised reference picture.

A picture comparator 14 compares, in real time, the successive pictures, in reduced format, of the televised program 10, with the picture recorded in memory 12.

This comparator 14 may not work on the 25 (or 30) pictures per second, but on one picture or on one picture frame, captured once per second for example.

Figure 2:
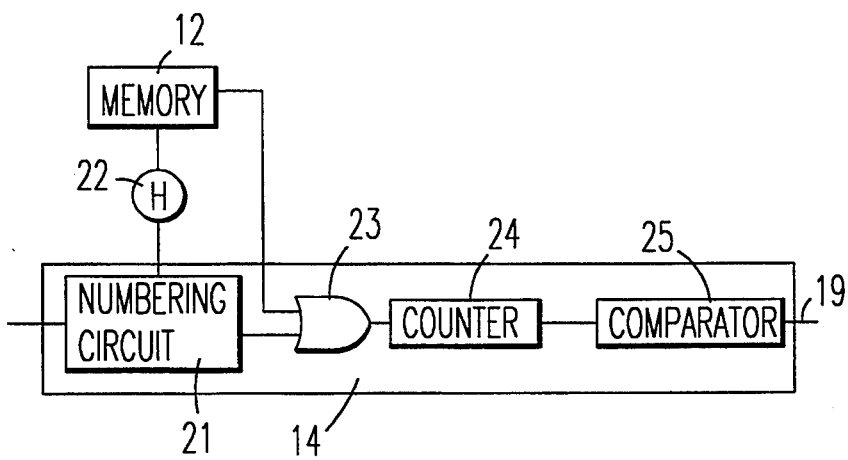
FIG. 2 is a block diagram detailing a preferred embodiment relating to the picture comparator circuit of FIG. 1.

As represented in FIG. 2, the comparator 14 advantageously comprises firstly a numbering circuit 21 which, in the case of a format reduction to $64 \times 64$ pixels with 3 levels, produces words of $64 \times 64 \times 3$ digits.

This word is compared digit by digit to the word corresponding to the recorded picture by means of logic gates. It will be noted that since the pictures are written sequentially on the screen 16, dot after dot in a line, and line after line for one of the interlaced half-frames, the comparison is preferably done sequentially between digits of the reduced datum from the scrolling pictures, and digits of the stored picture. The picture memory 12 must therefore be read sequentially, at the video rate furnished by the timer 22 of the device, and in the same order as that used to present the scrolling pictures. Under these conditions, a single logic gate 23 suffices, which delivers the digit 1 when it simultaneously receives 2 digits 1 or 2 digits 0 at inputs. The digits on output from the gate 23 are counted in a counter 24 and, when for a given picture the gate 23 has furnished $64 \times 64 \times 3$ digits "1" approximately, the picture sought is recognised. More precisely, the counter 24 advantageously feeds a comparator 25 with a predetermined threshold, the threshold corresponding to a recognised digit rate beyond which it is considered that the reference picture has been recognised in the scrolling sequence.

It will be observed that the format reducing and picture recognition methods are given here merely by way of example. It is evident that the smaller the format reduction executed by the module 11, the simpler is the comparator 14, and the faster it must operate. It is possible that for certain embodiments the minimum cost of the module 11+comparator 14 device is to be obtained for an even larger format reduction and a more elaborate picture recognition system. This system could for example operate as a Fourier transform correlator or a learning neural network, etc.

An actuator 18, controlled by the output 19 of the means for comparing 14 when this output corresponds to a positive recognition-datum, and is programed according to the action to be triggered on the passage of the picture identical to the memorised picture.

The functioning of the device of FIG. 1 can be particularly illustrated by the example of the recognition of a credit title picture of a televised transmission intended to be recorded on a home video recorder. Though the credit title pictures, as well as the musical messages which accompany them (Jingle) are complex, the problem of their recognition is in principle simple since they are always mutually identical, and since in general the signal to noise ratio is very good.

The analysis and recognition operations described hitherto for pictures can be applied to the musical message accompanying the credit title picture.

A few seconds of the start of the corresponding audio signal can be sampled at the frequency of a few kHz, on three to four levels (1 second at 3 kHz and 4 levels = 12 kbits, as against $64 \times 64 \times 3 = 12288$ bits of the previous example, namely the same order of magnitude).

Figure 3:
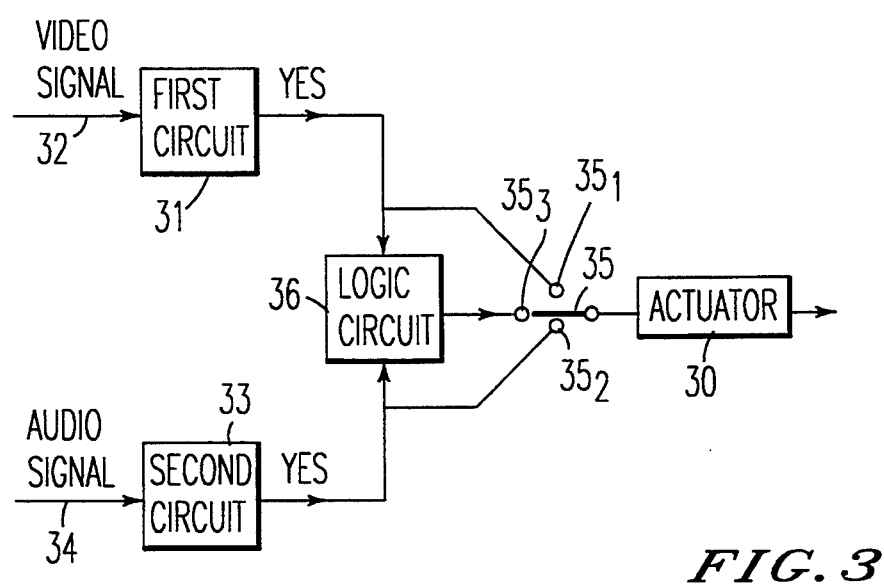
FIG. 3 is a block diagram illustrating the implementation of the invention in the case where the devices comprises on the one hand a picture recognition circuit and on the other hand a sound recognition circuit.

As represented in FIG. 3, the action programed for the video recorder can then be triggered either by the picture sought, or by the musical message accompanying it, or by both of these.

In the device shown diagrammatically in FIG. 3, the actuator 30 is driven:

either by a first circuit 31 of the type of that of FIG. 1 and comprising a picture datum reducer, and a comparator having one previously memorised reference picture reduced datum. This circuit 31 is fed by the complete or sampled video signal 32.

or by a second circuit 33 for recognising a portion of audio signal in a received audio signal 34. This circuit 33 advantageously comprises received signal 34 sampling means and means for comparing the sampled signals with a previously memorised reference audio signal setting.

Advantageously, this device comprises a switch 35 by means of which the user can drive the actuator selectively:

either through the picture recognition circuit 31 alone ($35_1$)

or through the sound recognition circuit 32 alone ($35_2$)

or through the conjunction of recognition by the two circuits, or again the recognition of at least one of the two data ($35_3$). In this case, the logic circuit 36 is an AND circuit or an inclusive OR circuit respectively.

In the case of reception of several televised programs (or channels, or networks) the programming of the corresponding recordings requires the storing of at least one picture per program. These pictures are then advantageously stored in at least as many memories as there are channels, and indexed to these channels. This picture (or these pictures) indexed to a channel is (are) called up automatically at the time of the programming relating to the channel.

Of course, in a sophisticated embodiment of the invention, the programming must enable the user to start or stop the recording on the appearance of the sought-after picture, to stop and recommence the recording on successive appearances of the same picture, etc.

It may be noted that the principle of the recognition of a musical sequence may be employed for the programming of a tape recorder assigned the task of only the audio recording of the received sequence. This case corresponds to the setting of the breaker 35 at $35_2$, the actuator 30 then driving the relevant recording tape recorder.

We claim:

1. A device for driving a recording apparatus for selective recording of an audio and/or video sequence from a set of received signal sequences, comprising:
   reducing means for reducing the set of received signal sequences to generate reduced data;
   selecting means for selecting a reduced reference portion from the reduced data;
   storing means for storing the selected reduced reference portion;
   comparing means for comparing the stored reduced reference portion with the reduced data picked up from the set of received signal sequences and output by the reducing means; and
   control means for controlling the recording apparatus to be activated to begin recording only when the comparing means detects a positive comparison between the stored reduced reference portion and the reduced data picked up from the set of received signal sequences.

2. The driving device according to claim 1, wherein the comparing means comprises a single logic gate for receiving as inputs the reduced reference portion from the storing means and the reduced data picked up from the set of received signal sequences, an output of the single logic gate indicating whether the reduced reference portion matches the reduced data picked up from the set of received signal sequences.

3. The driving device according to claim 2, wherein the comparing means further comprises a counter which is incremented each time the stored single logic gate detects a positive comparison between the reduced reference portion and the reduced data picked up from the set of received signal sequences.

4. The driving device according to claim 3, wherein the control means activates the recording apparatus to begin recording when the counter exceeds a predetermined value.

5. The driving device according to claim 1, wherein the comparing means comprises means for detecting a positive comparison between the stored reduced reference portion and the reduced data picked up from the set of received signal sequences by mathematical transformations and artificial intelligence.

6. The driving device according to claim 1, wherein the reducing means reduces levels of luminance components of the set of received signal sequences.

7. The driving device according to claim 6, wherein the reducing means further reduces levels of chrominance components of the set of received signal sequences.

8. The driving device according to claim 1, wherein the reducing means reduces levels of chrominance components of the set of received signal sequences.

9. The driving device according to claim 1, wherein the reducing means undersamples at least one frame from the set of received signal sequences.

10. A device for driving a recording apparatus for selective recording of a picture sequence from a set of electronic picture sequences, comprising:
    means for reducing the set of electronic picture sequences to generate reduced picture data;
    selecting means for selecting at least one reduced reference picture from the reduced picture data;
    a memory for storing the selected reduced reference picture;
    a comparator for comparing the stored reduced reference picture with the reduced picture data picked up from the set of electronic picture sequences and output by the means for reducing;
    a controller for controlling the recording apparatus to be activated to begin recording only when the comparator detects a positive comparison between the stored reduced reference picture and the reduced picture data picked up from the set of electronic picture sequences.

11. The driving device according to claim 10, wherein the comparator comprises a single logic gate for receiving as inputs the reduced reference picture from the memory and the reduced picture data picked up from the set of electronic picture sequences, an output of the single logic gate indicating whether the reduced reference picture matches the reduced picture data picked up from the set of received electronic picture sequences.

12. The driving device according to claim 11, wherein the comparator further comprises a counter which is incremented each time the single logic gate detects a positive comparison between the stored reduced reference picture and the reduced picture data picked up from the set of received electronic picture sequences.

13. The driving device according to claim 12, wherein the controller activates the recording apparatus to begin recording when the counter exceeds a predetermined value.

14. The driving device according to claim 10, wherein the comparator comprises means for detecting a positive comparison between the stored reduced reference picture and the reduced picture data picked up from the set of electronic picture sequences by mathematical transformations and artificial intelligence.

15. The driving device according to claim 10, wherein the means for reducing reduces levels of luminance components of the set of received electronic picture sequences.

16. The driving device according to claim 15, wherein the means for reducing further reduces levels of chrominance components of the set of received electronic picture sequences.

17. The driving device according to claim 10, wherein the means for reducing reduces levels of chrominance components of the set of received electronic picture sequences.

18. The driving device according to claim 10, wherein the means for reducing undersamples at least one frame from the set of received electronic picture sequences.

19. A device for driving a recording apparatus for selective recording of at least one of an audio or video sequence from a set of received signal sequences, comprising:

a circuit for video recognition comprising:
  a reducing means for reducing video images from the set of received signal sequences to generate reduced video data;
  a selecting means for selecting a reference video portion from the reduced video data;
  a first memory for storing the selected reduced reference video portion;
  a first comparator for comparing the stored reduced reference video portion with the reduced video data picked up from the set of received signal sequences and output by the reducing means;
a circuit for audio recognition comprising:
  sampling means for sampling audio signals from the set of received signal sequences and selecting a reference audio portion;
  a second memory for storing the selected reference audio portion;
  a second comparator for comparing the stored reference audio portion with the sampled audio signals picked up from the set of received signal sequences;
a controller for controlling the recording apparatus to be activated to begin recording only when at least one of the first or second comparators detects a positive comparison.

* * * * *

UNITED STATES PATENT AND TRADEMARK OFFICE
CERTIFICATE OF CORRECTION

PATENT NO. : 5,440,400
DATED : August 8, 1995
INVENTOR(S) : François MICHERON, et al.

It is certified that error appears in the above-indentified patent and that said Letters Patent is hereby corrected as shown below:

On the title page, Item [75], the first inventor's name should read:

--François Micheron--

Signed and Sealed this

Tenth Day of October, 1995

Attest:

BRUCE LEHMAN

Attesting Officer    Commissioner of Patents and Trademarks